United States Patent
Nakashima

(10) Patent No.: US 9,050,928 B2
(45) Date of Patent: Jun. 9, 2015

(54) HEADLAMP DEVICE AND LUMINANCE CONTROL METHOD THEREFOR

(75) Inventor: Kazuhiko Nakashima, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 44 days.

(21) Appl. No.: 13/822,899

(22) PCT Filed: Sep. 5, 2011

(86) PCT No.: PCT/IB2011/002043
§ 371 (c)(1),
(2), (4) Date: Mar. 13, 2013

(87) PCT Pub. No.: WO2012/035392
PCT Pub. Date: Mar. 22, 2012

(65) Prior Publication Data
US 2013/0169155 A1 Jul. 4, 2013

(30) Foreign Application Priority Data
Sep. 17, 2010 (JP) ................................. 2010-209089

(51) Int. Cl.
*B60Q 1/14* (2006.01)
*H05B 37/02* (2006.01)

(52) U.S. Cl.
CPC *B60Q 1/14* (2013.01); *B60Q 1/143* (2013.01); *B60Q 2300/054* (2013.01); *B60Q 2300/112* (2013.01); *B60Q 2300/114* (2013.01); *B60Q 2300/12* (2013.01); *B60Q 2300/142* (2013.01); *B60Q 2300/312* (2013.01); *B60Q 2300/334* (2013.01)

(58) Field of Classification Search
CPC ................................. H05B 37/02; G06K 9/00
USPC ............ 382/108, 103–107; 315/158, 82, 149, 315/104, 108
See application file for complete search history.

(56) References Cited

U.S. PATENT DOCUMENTS

| | | | |
|---|---|---|---|
| 7,888,876 B2* | 2/2011 | Kitagawa et al. | 315/80 |
| 8,224,533 B2* | 7/2012 | Furusawa | 701/49 |
| 2003/0123705 A1* | 7/2003 | Stam et al. | 382/104 |
| 2003/0123706 A1* | 7/2003 | Stam et al. | 382/104 |
| 2005/0152581 A1* | 7/2005 | Hoki et al. | 382/104 |
| 2007/0030138 A1 | 2/2007 | Ito et al. | |
| 2009/0026958 A1* | 1/2009 | Kitagawa et al. | 315/77 |

(Continued)

FOREIGN PATENT DOCUMENTS

| | | |
|---|---|---|
| DE | 10 2009 039 179 A1 | 3/2010 |
| EP | 2 127 944 A1 | 12/2009 |

(Continued)

OTHER PUBLICATIONS

International Search Report and Written Opinion for corresponding International Patent Application No. PCT/IB2011/002043 mailed Dec. 16, 2011.

*Primary Examiner* — Douglas W Owens
*Assistant Examiner* — Wei Chan
(74) *Attorney, Agent, or Firm* — Sughrue Mion, PLLC

(57) ABSTRACT

To provide a headlamp device for a vehicle that has LEDs as light sources, the headlamp device including a situation detection part that detects a lighting status of headlamps; and a dimming control part that reduces the luminance of the headlamps to a prescribed value that is greater than zero based on the lighting status of the headlamps.

11 Claims, 11 Drawing Sheets

(56) References Cited

U.S. PATENT DOCUMENTS

| | | | |
|---|---|---|---|
| 2009/0237008 A1* | 9/2009 | Noguchi | 315/297 |
| 2009/0323366 A1* | 12/2009 | Furusawa | 362/466 |
| 2010/0052550 A1* | 3/2010 | Kobayashi | 315/158 |

FOREIGN PATENT DOCUMENTS

| | | |
|---|---|---|
| JP | 06-113308 A | 4/1994 |
| JP | 2002-193027 A | 7/2002 |
| JP | 2002-193028 A | 7/2002 |
| JP | 2004-291816 A | 10/2004 |
| JP | 2007-038723 A | 2/2007 |
| JP | 2009-029227 A | 2/2009 |
| JP | 2009-032494 A | 2/2009 |
| JP | 2009-220773 A | 10/2009 |
| JP | 2010-006172 A | 1/2010 |
| WO | 98/54030 A1 | 12/1998 |
| WO | 01/70538 A2 | 9/2001 |

* cited by examiner

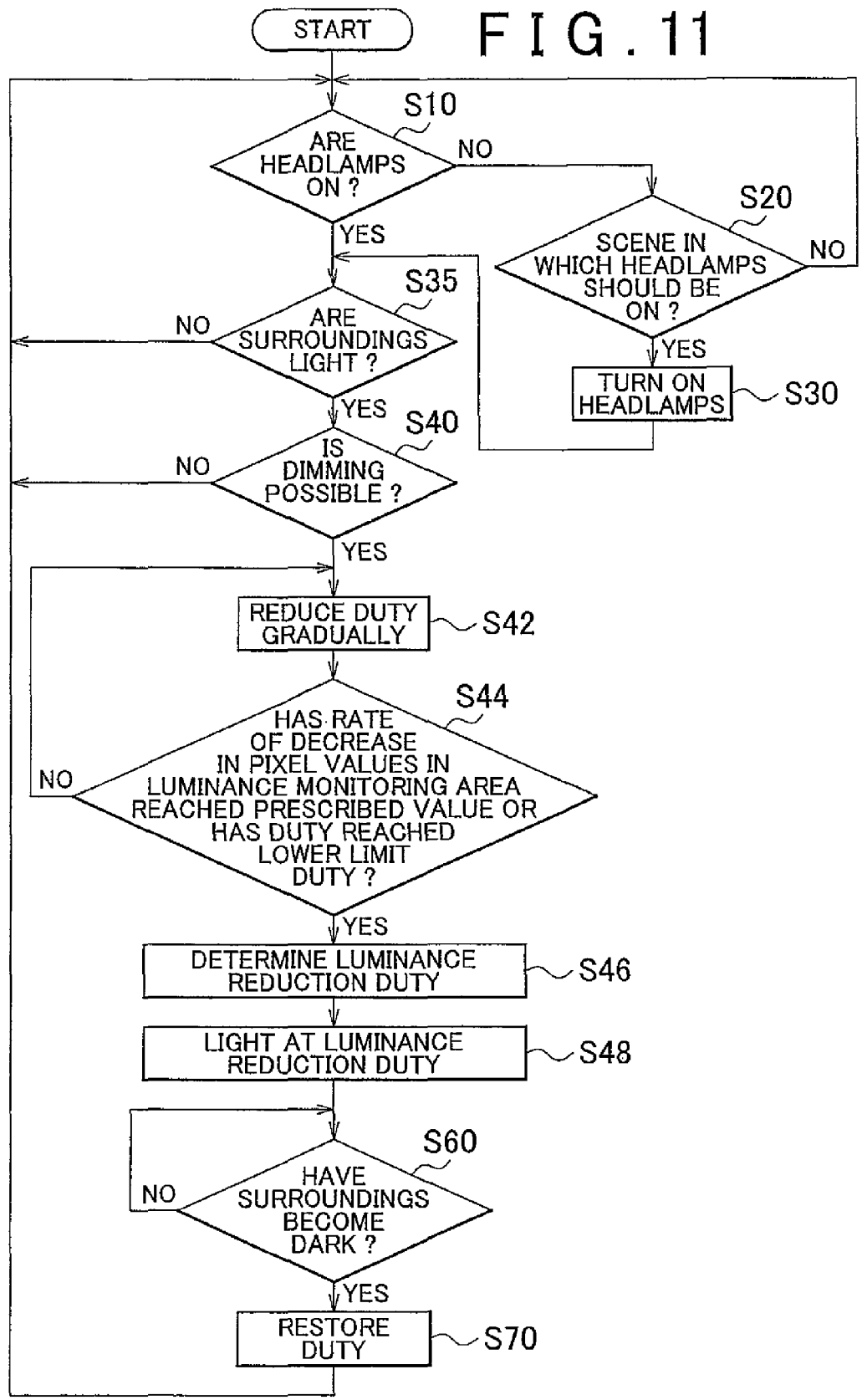

HEADLAMP DEVICE AND LUMINANCE CONTROL METHOD THEREFOR

INCORPORATION BY REFERENCE

The disclosure of Japanese Patent Application No. 2010-209089 filed on Sep. 17, 2010,including the specification, drawings and abstract is incorporated herein by reference in its entirety.

BACKGROUND OF THE INVENTION

1. Field of the Invention

The present invention relates to a headlamp device for a vehicle, and more particularly, to a headlamp device with adjustable brightness and a luminance control method for the headlamp device.

2. Description of the Related Art

All vehicles are required to be equipped with headlamps. An attempt to improve the driver's field of vision within the confines of the law is sometimes made. For example, an AFS (Adaptive Front-Lighting System), in which the optical axis moves in the direction in which the vehicle is steered by the driver when the vehicle is moving, is known.

Japanese Patent Application Publication No. 2002-193027 (JP-A-2002-193027) discloses a light distribution control device which, on detecting the entrance of the vehicle into a registered control area, performs light distribution control that is registered for the control area. JP-A-2002-193027 discloses a technology to perform control with consideration for pedestrians and oncoming vehicles by shining light on a laterally elongated area in a residential district with many pedestrians so that the driver can see pedestrians easily, turning on the headlamps automatically on roads which are dark day and night such as forest roads, and reducing the amount of light in the vertical direction and illuminating the right and left sides of the vehicle intensively in, for example, a parking lot.

Japanese Patent Application Publication No. 2004-291816 (JP-A-2004-291816) discloses a headlight luminance control device which, when the light from the headlamps of another vehicle that is traveling near the vehicle in question is too strong, creates a dimming command to reduce the luminance of the headlamps of the other vehicle and send the command to the other vehicle.

However, the problem of the technology that is disclosed in JP-A-2002-193027 is that power consumption cannot be reduced because changing the luminance of the headlamps is not considered. In JP-A-2004-291816, a control procedure that includes a step in which the vehicle in question sends a command to dim the headlights to the other vehicle and a step in which the other vehicle dims its headlights to a luminance level that is not lower than lower limit luminance information as a lower limit is considered. However, the problem is that the vehicle cannot determine whether to dim its own headlights. In addition, there is no disclosure about how to dim the headlights in JP-A-2004-291816.

Conventionally, halogen lamps or discharge headlights are often used for headlamps, and it is, therefore, difficult to dynamically change the luminance of headlamps. However, the use of LED lamps (light-emitting diode lamps) with higher luminous efficiency in headlamps is gradually increasing. The luminance of LEDs can be changed easily even during driving, but variable control of the luminance of headlamps that use LEDs has not been considered.

SUMMARY OF THE INVENTION

In view of the above problems, the present invention provides a headlamp device which can determine whether to dim the headlamps of the vehicle in order to adjust the luminance and a luminance control method for the headlamp device.

According to an aspect of the present invention, there is provided a headlamp device for a vehicle that has LEDs as light sources, the headlamp device including a situation detection part that detects a lighting status of headlamps; and a dimming control part that reduces the luminance of the headlamps to a prescribed value that is greater than zero based on the lighting status of the headlamps.

According to another aspect of the present invention, there is provided a luminance control method for a headlamp device for a vehicle that has LEDs as light sources. The control method includes the steps of detecting a lighting status of headlamps; and reducing the luminance of the headlamps to a prescribed value that is greater than zero based on the lighting status of the headlamps.

According to the headlamp device and the luminance control method for the headlamp device, because a lighting status of the headlamps is detected and the luminance of the headlamp is reduced to a prescribed value which is greater than zero based on the lighting status of the headlamps, the luminance of the headlamp can be reduced to reduce power consumption.

It is preferred that the headlamp device further includes a dimming possibility determination part that determines that dimming is possible when the rate of decrease in ambient illuminance which is observed when the lu'minance of the headlamps is reduced by a prescribed amount is smaller than a threshold value. According to the headlamp device, the headlamps can be dimmed appropriately because the headlamps are dimmed when the ambient brightness is sufficient even if the luminance of the headlamps are reduced by a prescribed amount.

In the headlamp device, it is also preferred that the dimming control part reduces the luminance of the headlamps within confines of the law. It is also preferred that the dimming control part reduces the luminance of the headlamps to a lower limit within confines of the law.

It is also preferred that the headlamp device further includes a camera that has an optical axis that extends ahead of the vehicle, and the dimming possibility determination part determines whether the rate of decrease in ambient illuminance is smaller than a threshold value by comparing pixel value information in image data that are acquired by the camera before the luminance of the headlamps is reduced by a prescribed amount and pixel value information in image data that are acquired by the camera after the luminance of the headlamps is reduced by the prescribed amount.

In the headlamp device, it is also preferred that the dimming possibility determination part monitors the pixel value information that is acquired when the luminance of the headlamps is gradually reduced, and the dimming control part determines the luminance at a time when the pixel value information is changed by a prescribed percentage from the pixel value information before the luminance is reduced as the luminance of the headlamps.

In the headlamp device, it is also preferred that the dimming possibility determination part determines whether the rate of decrease in ambient illuminance is smaller than a threshold value based on pixel value information in a predetermined area in the image data that is more likely to be affected by the ambient illuminance than by a change of the surrounding scenery.

In the headlamp device, it is also preferred that the dimming control part reduces the luminance of the headlamps by reducing the duty of a Pulse Width Modulation (PWM) signal that drives a plurality of LEDs. According to the headlamp} device, because the pixel value in a luminance monitoring area can be reduced by reducing the duty of the PWM signal that drives the LEDs, the luminance of the headlamps can be reduced.

In the headlamp device, it is also preferred that the dimming control part reduces the luminance of the headlamps by turning off some of the plurality of LEDs.

In the headlamp device, it is also preferred that the situation detection part detects the lighting status of the headlamps when the vehicle turns left, and that the dimming control part turns off only the headlamp on the right. According to the headlamp device, because only the right headlamp is dimmed when the vehicle turns left, power consumption can be reduced without affecting the driver's field of vision.

In the headlamp device, it is also preferred that the situation detection part detects the lighting status of the headlamps when the vehicle is being driven on a highway with the headlamps forming a driving beam distribution, and the dimming control part reduces the luminance of headlamps that form a dipped beam distribution. According to the headlamp device, because the luminance of the headlamps that forms a dipped beam light distribution can be reduced when the vehicle is being driven on a highway with the headlamps forming a driving beam distribution (high beams), power consumption can be reduced without affecting the driver's field of vision.

In the headlamp device, it is also preferred that the situation detection part detects the lighting status of the headlamps when the vehicle is being driven in a fog with fog lamps on, and that the dimming control part reduces the luminance of the headlamps. When the vehicle is being driven with the fog lamps on, reduction of the luminance of the headlamps does not affect the driver's control of the vehicle because the fog lamps are providing sufficient illuminance. Therefore, power consumption can be reduced without affecting the safe driving of the vehicle.

In the headlamp device, it is also preferred that the situation detection part detects that the vehicle is being driven in a fog from the fact that a calculation value that is obtained by performing a filtering process on image data on the outside of the vehicle that are acquired by the camera is equal to or greater than a threshold value, the fact that the degree of coincidence as compared to image data of a foggy scene that are preliminarily provided is equal to or greater than a threshold value, or the fact that the weather information that is acquired from outside indicates that it is foggy in the area where the vehicle is being driven.

As described above, power consumption of the headlamps can be reduced because the headlamp device of the present invention and the luminance control method for the headlamp device can determine whether to dim the headlamps of the vehicle before adjusting the luminance.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 11 shows an example of a flowchart that shows a procedure by which the headlamp device of the third embodiment of the present invention dims the headlamps.

DETAILED DESCRIPTION OF EMBODIMENTS

Description will be hereinafter made of embodiments for implementing the present invention with reference to the drawings.

Figure 1:
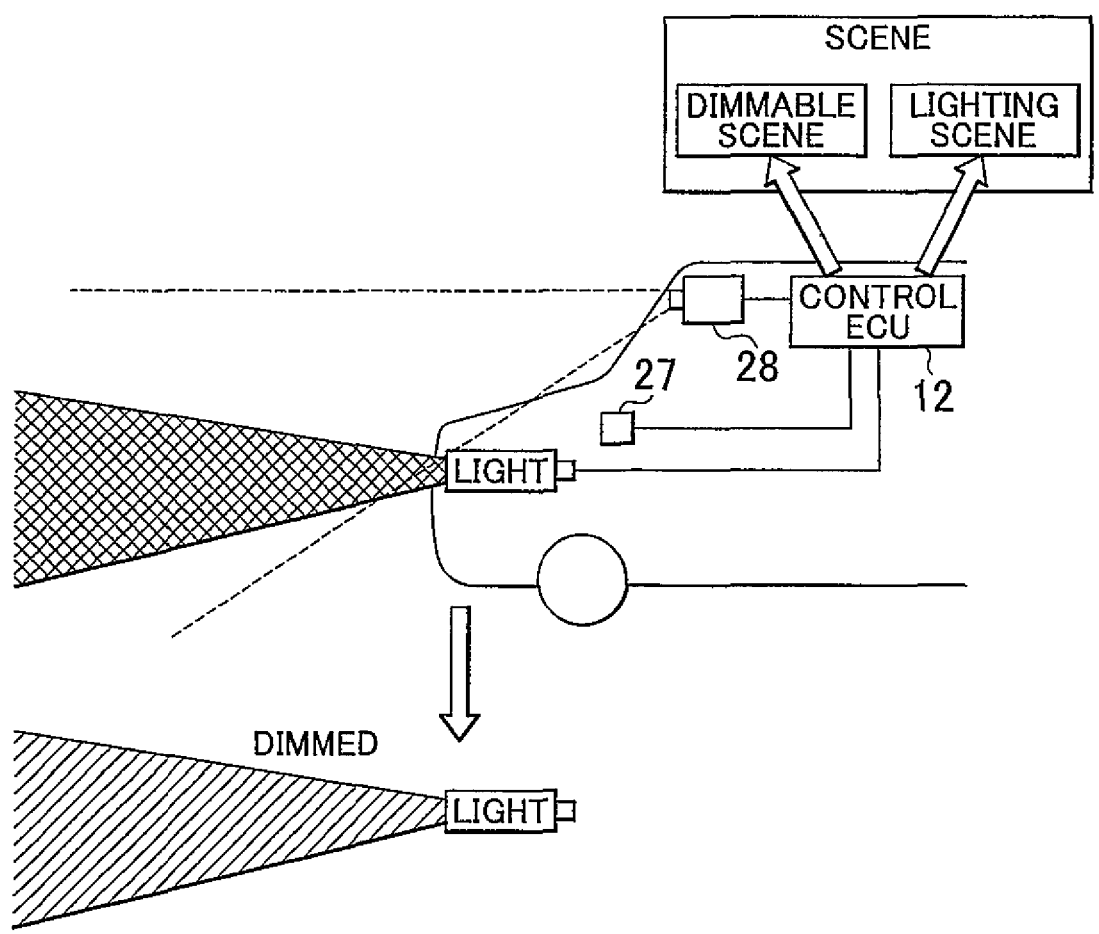
FIG. 1 shows an example of a drawing that illustrates the general configuration of a headlamp device of each embodiment of the present invention.

A first embodiment of the present invention is first described. FIG. 1 shows an example of a drawing that illustrates the general configuration of a headlamp device of the first embodiment of the present invention. The headlamp device of the first embodiment is characterized by determining the scene in which the vehicle is placed and dimming the headlamps (the light in the drawing) when the scene matches an expected situation. It should be noted that, in the first embodiment, the brightness that the driver and other people feel psychologically, which is referred to as "illuminance," and the brightness of the light sources of the headlamps, which is referred to as "luminance," are two different things. While the physical units of illuminance and luminance include lumen, lux and candela, the "luminance" and "illuminance" are both represented by common measurement method and unit because there is no particular need to limit their measurement method and unit.

The scene can be largely divided into two, types; lighting scene and dimmable scene. A lighting scene is a scene in which the lights of the vehicle should be on. The headlamp device determines that the vehicle is in a scene in which the lights should be on based on the fact that images that are photographed by a camera 28 are dark, the fact that the illuminance that is detected by an illuminance sensor 27 is lower than a prescribed value, the fact that the switch for the headlamps is on, or the like.

Specific examples of the lighting scene include when the vehicle is passing through a tunnel and when the vehicle is being driven at dawn or dusk.

Because the headlamp device automatically turns on the switch for the headlamps or the driver turns on the switch for the headlamps, the headlamps are lighted. When it is determined that the vehicle is in a lighting scene and the headlamps are lighted, the headlamp device determines whether the vehicle is in a dimmable scene. A dimmable scene is a situation in which dimming is possible. Whether or not dimming is possible is determined based on whether the ambient illuminance may be significantly changed when the headlamp device changes the luminance of the headlamps.

As is experimentally known, turning on or off headlamps in the dark has such a significant effect on the ambient illuminance that it can be visually recognized from quite a distance whereas turning on or off headlamps in a bright environment has an insignificant effect on the ambient illuminance. Thus, the headlamp device can determine whether the vehicle is in a dimmable scene by dimming the headlamps and monitoring the change in ambient illuminance with the camera 28.

When it is determined that the vehicle is in a dimmable scene, the headlamp device can reduce the luminance of the headlamps to reduce power consumption. Specific examples of the dimmable scene include when the vehicle is passing through a brightly-illuminated tunnel and when the vehicle is being driven after it gets light in the morning or before it gets dark in the evening. Conventionally, headlamps are lighted at a constant luminance regardless of the ambient brightness in such a situation. In the first embodiment, however, the luminance of the headlamps can be reduced.

Figure 2:
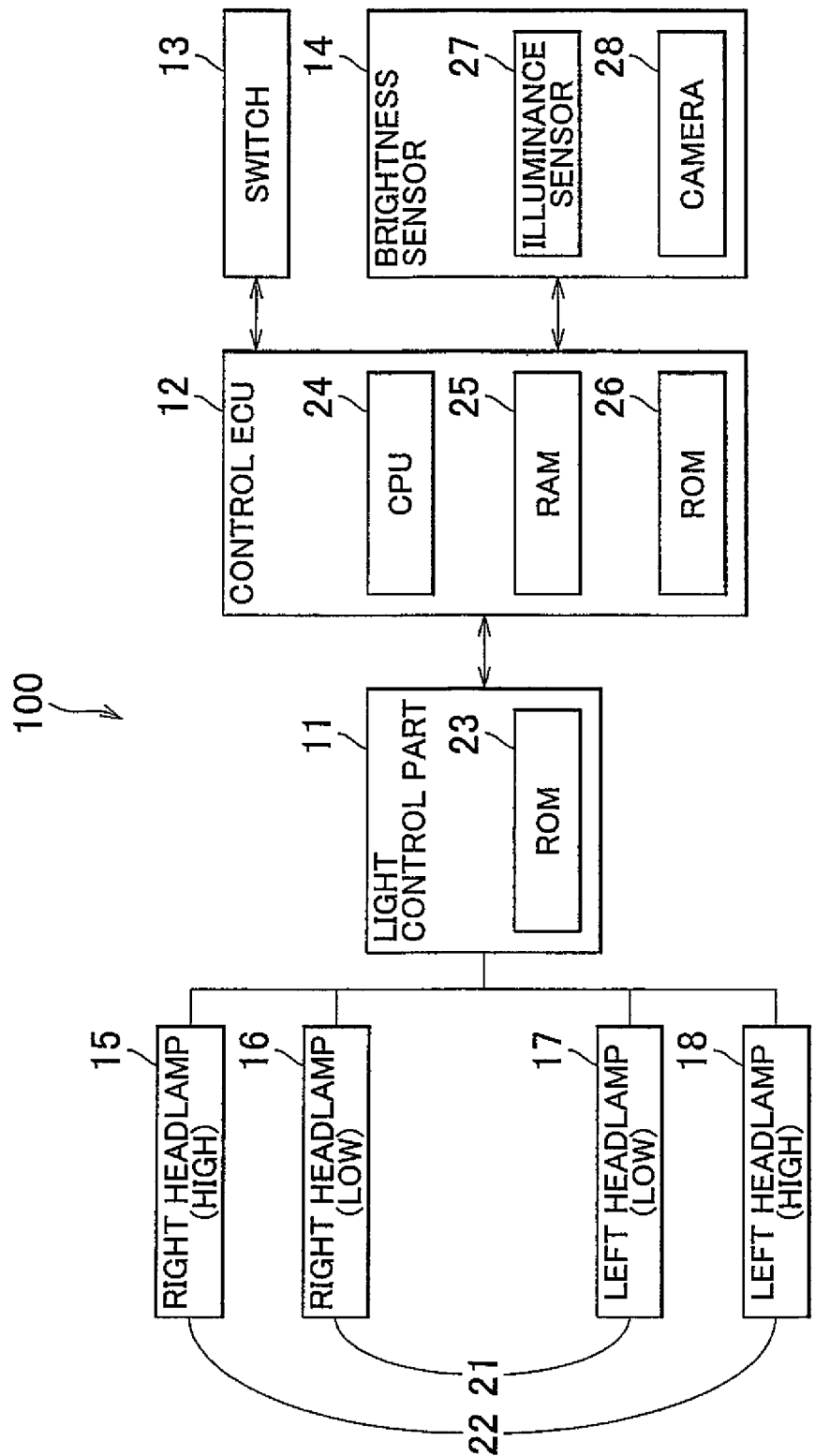
FIG. 2 shows an example of a block diagram of the headlamp device of each embodiment of the present invention.

FIG. 2 shows an example of a block diagram of a headlamp device 100. The headlamp device 100 is controlled by a control ECU (Electronic Control Unit) 12. A light control part 11, a brightness sensor 14, and a switch 13 are connected to the control ECU 12. The light control part 11 is connected to a right headlamp (high) 15, a right headlamp (low) 16, a left headlamp (high) 18, and a left headlamp (low) 17. The right headlamp (low) 16 and the left headlamp (low) 17 are hereinafter referred to simply as "headlamps (low) 21," and the right headlamp (high) 15 and the left headlamp (high) 18 are hereinafter referred to simply as "headlamps (high) 22."

Figure 3A:
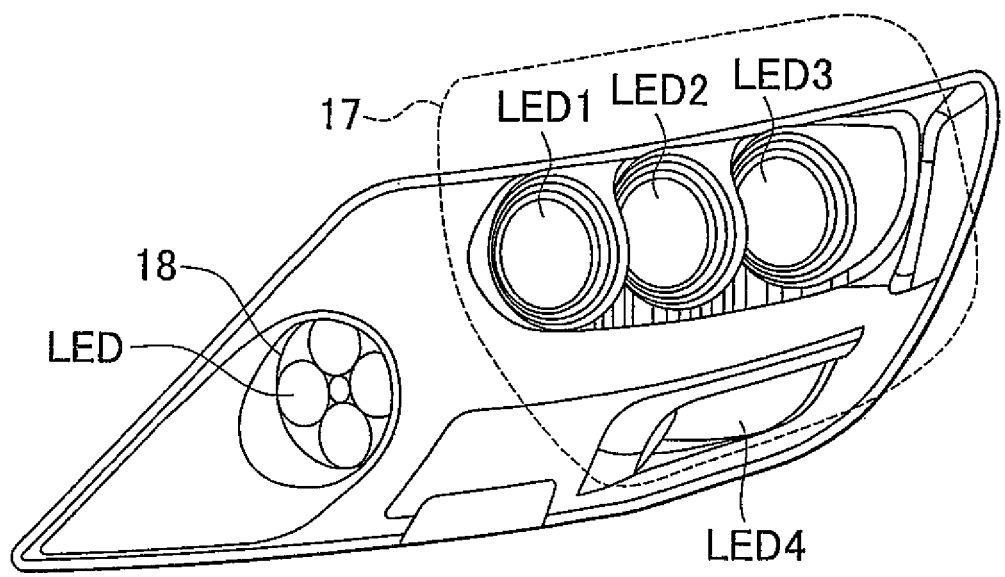
FIG. 3A and FIG. 3B show an example of a schematic perspective view and a general configuration diagram, respectively, of a left headlamp in each embodiment of the present invention.
Figure 3B:
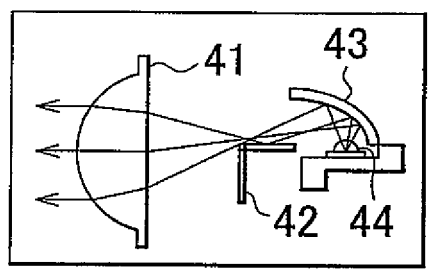
Figure 3B:
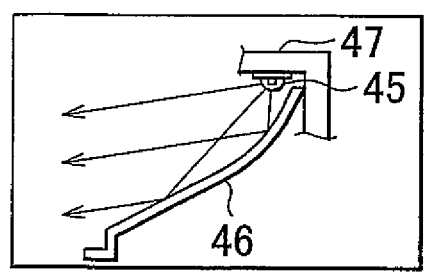

FIGS. 3A and 3B show an example of a schematic perspective view and a general configuration diagram, respectively, of the left headlamp (low) 17 and the left headlamp (high) 18. In a vehicle, a plurality of light sources are usually combined to form low beams (a dipped beam distribution) and high beams (a driving beam distribution) to satisfy the requirements of laws, design and performance. The left headlamp (low) 17 and the left headlamp (high) 18 that are shown in FIG. 3A are formed of four LEDs and five LEDs, respectively. While the number and location of LEDs may be changed according to the requirements as described above, a desired light distribution pattern can be easily formed when a plurality of LEDs are combined. Of the four LEDs of the left headlamp (low) 17 in FIG. 3A, LEDs 1 to 3 have the same structure and an LED 4 has a different structure. While description of the headlamps (high) 22 is omitted, the five LEDs may be the same or different in structure.

As shown in the left-hand side of FIG. 3B, each of the LEDs 1 to 3 is a light-concentrating headlamp device, and has a projector lens 41, a shade portion 42, a reflector 43 and an LED 44. The reflector 43 is located to extend over the shade portion 42, and has a curved surface that is designed to concentrate most of the direct light from the LED 44 onto the shade portion 42.

The shade portion 42 is formed in a plate-like shape in a position generally along the optical axis of the projector lens 41. The shade portion 42 has an upper side on which a reflecting surface is formed by aluminum deposition, for example.

The shade portion 42 is positioned such that the reflecting surface is located at the rear focal point of the projector lens 41. Thus, most of the light from the LED 44 is reflected by the reflector 43 and concentrated to the rear focal point of the projector lens 41, and is reflected at the rear focal point and enters the rear side of the projector lens 41. Then, the light is projected ahead of the vehicle generally parallel to the optical axis by the projector lens 41.

As shown in the right-hand side of FIG. 3B, the LED 4 is a light-diffusing headlamp device, and has a base plate 47 on which an LED 45 is located, and a parabolic cylindrical reflector 46 that is integrated with the base plate 47 and formed of a part of a parabolic cylindrical surface. The LED 45 is located near the focal point of the parabolic cylindrical reflector 46 on the base plate 47. Because the light from the LED 45, which is located near the focal point, is converted into a parallel light flux when reflected on the parabolic cylindrical reflector 46, the light is emitted in a state close to a parallel light flux in the vertical direction and as a diffusive light flux in the lateral direction.

A desired light distribution pattern can be obtained by designing the shape of the reflectors 43 and positions of the shade portions 42 of the LEDs 1 to 3, and the shape of the parabolic cylindrical reflector 46 of the LED 4 as described above.

Referring again to FIG. 2, the light control part 11 acquires a control signal from the control ECU 12 and controls the luminance of the headlamps (low) 21 and the headlamps (high) 22. The light control part 11 generates a Pulse Width Modulation (hereinafter called as PWM) signal from a power supply (not shown), and supplies the PWM signal to the headlamps (low) 21 and the headlamps (high) 22. The luminance of the headlamp (low) 21 and the headlamps (high) 22 can be changed by changing the duty of the PWM signal. The closer to 100% the duty is, the more light the LEDs can emit and the higher (brighter) the luminance of the headlamps (low) 21 and the headlamps (high) 22 is. The light control part 11 can individually control the luminance of each of the right headlamp (high) 15, the right headlamp (low) 16, the left headlamp (high) 18 and the left headlamp (low) 17.

Here, the brightness of the headlamps (low) 21 and the headlamps (high) 22 is regulated by law. For example, Article 32 of Safety Standards in Japan states that "high beam lights should enable the driver to see a traffic obstacle ahead at a distance of 100 meters and have a maximum total luminance of not greater than 225,000 candelas" and states about low beam lights that "the lights from dipped-beam headlamps should not obstruct other traffic and should enable the driver to see a traffic obstacle ahead at a distance of 40 meters at night when all of them are turned on at the same time." Thus, there is no regulation about numerical values but the lower limit of the brightness to be provided is defined for both the headlamps (low) 21 and the headlamps (high) 22.

The vehicle manufacturer or headlamp manufacturer has determined the lower limit of duty so as to guarantee the lower limit of brightness at the time of shipment, and recorded the lower limit of duty a ROM 23 of the light control part 11. Thus, the light control part 11 does not control the duty of the PWM signal to a value which is lower than the lower limit even if it is requested to reduce the luminance to a value below the lower limit by the control ECU 12, and does not control the duty of the PWM signal to a value which is higher than an upper limit in the case of high beams.

In reality, the vehicle manufacturer or headlamp manufacturer has determined a duty that has a sufficient margin to the lower limit of duty as a default of duty and recorded it in the ROM 23 or the like of the light control part 11. The lower limit of duty is hereinafter referred to as "lower limit duty," and the default of duty is hereinafter referred to as "default duty." Thus, the light control part 11 variably controls the duty between a lower limit duty and a default duty which are recorded in the ROM 23, to change the luminance within the confines of the law.

Every country has similar standards. For example, in the United States, FMVSS 108 provides the upper and lower limits of brightness for each type of light source (Luminous Flux). In Europe, 76/76/ECE provides regulations about headlights. In the headlamp device 100 of the first embodiment, the lower limit duty and default duty are determined according to the laws and regulations of the destination country of the vehicle.

The control ECU 12 has a CPU 24, a RAM 25, and a ROM 26, and is additionally equipped with an input-output interface, an ASIC (Application Specific Integrated Circuit), a nonvolatile memory, an onboard LAN device, and so on. The control ECU 12 is a body ECU, for example, but may be an ECU of any type as long as it has resource to determine the above scenes.

The switch 13 and the brightness sensor 14 are connected to the control ECU 12. The switch 13 is located at an end of a lever-like member that extends from the steering column, and turns on the switch 13 of the headlamps (low) 21 when rotated in a prescribed direction by the driver. The switch 13 of the headlamps (high) 22 can be turned on and off when the lever-like member is operated back and forth.

When the rotational position of the switch 13 is set at "Auto," the headlamps (low) 21 operates as conlight (which are also referred to as "auto light"). In other words, when the illuminance sensor 27, which is described later, detects a illuminance which is lower than a prescribed value, the light control part 11 automatically turns on the headlamps (low) 21.

The brightness sensor 14 is composed of at least one of the illuminance sensor 27 and the camera 28, for example. The illuminance sensor 27 amplifies, with an amplifier circuit, an electric signal that is photoelectrically converted by a photodiode or a phototransistor and outputs the amplified signal to the control ECU 12. The illuminance sensor 27 is located on the dashboard, for example, and outputs a signal when the illuminance around the illuminance sensor 27 falls below a prescribed value. Because the signal means that it is late in the afternoon or in the evening or the vehicle has entered a tunnel, the control ECU 12 can turn on the headlamps (low) 21 without the driver's operation by requesting the light control part 11 to turn on the headlamps (low) 21. As described above, the illuminance sensor 27 functions as a sensor that enables the control ECU 12 to detect that the vehicle is in a lighting scene.

The camera 28 amplifies light from a photoelectric conversion element such as CCD or CMOS by photoelectric conversion and performs A/D conversion to output a digital image (infrared image) with prescribed luminance levels (256 gray levels, for example). The camera 28 repeats this procedure and outputs image data to the control ECU 12 at a prescribed frame rate (30 to 60 fps, for example).

The camera 28 functions as a sensor that enables the control ECU 12 to detect that the vehicle is in a lighting scene or dimmable scene. In other words, the control ECU 12 detects that it is necessary to turn on the lights based on the fact that the pixel values in the image data are small as a whole. In addition, the control ECU 12 detects that the headlamps (low) 21 and the headlamps (high) 22 can be dimmed based on the image data as described later.

Figure 4:
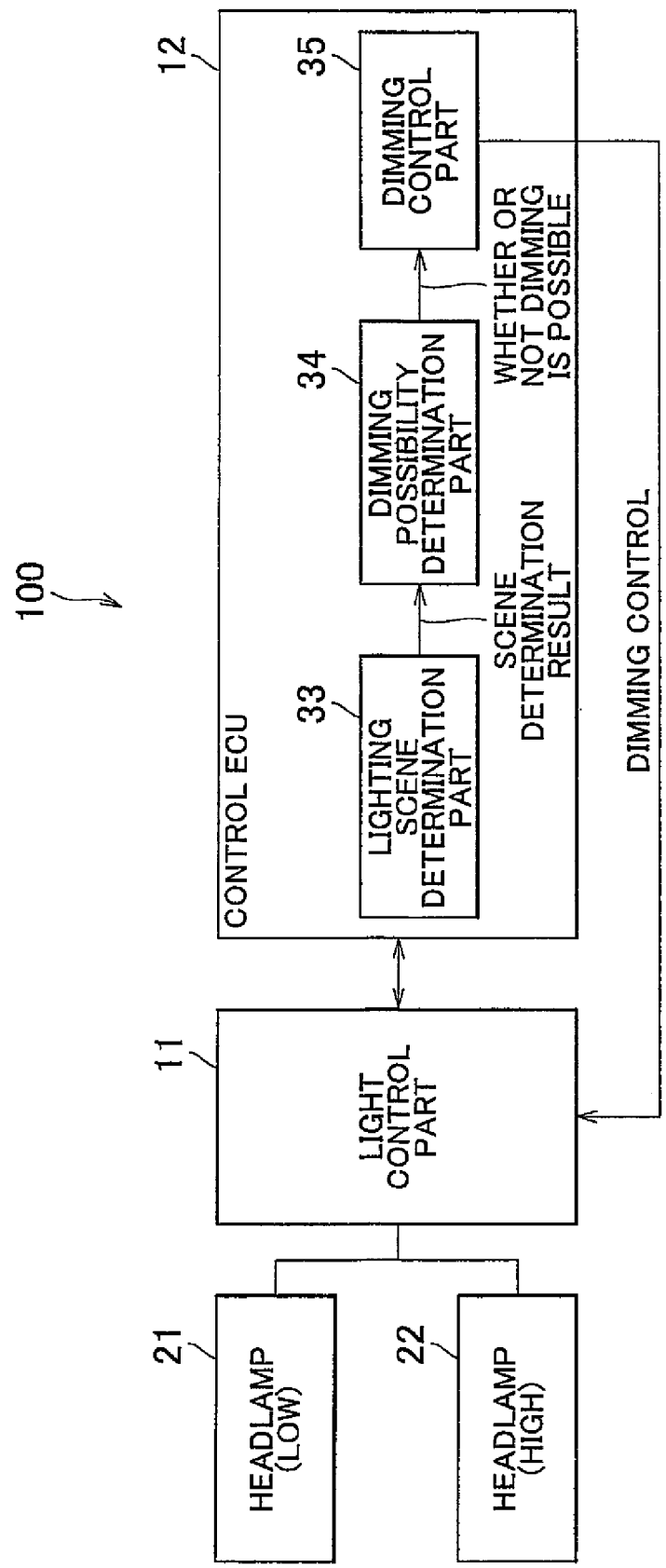
FIG. 4 shows an example of a functional block diagram of the headlamp device of each embodiment of the present invention.

FIG. 4 shows an example of a functional block diagram of the headlamp device 100. Each functional block in FIG. 4 is realized when the CPU 24 executes a program that is stored in the ROM 26 or by a hardware circuit. The control ECU 12 has a lighting scene determination part 33, a dimming possibility determination part 34, and a dimming control part 35. The lighting scene determination part 33 determines whether the vehicle is in a scene in which the headlamps (low) 21 should be on. In other words, the lighting scene determination part 33 detects the lighting status of the headlamps. The determination in the first embodiment is the same as that in a conventional conlight.

The dimming possibility determination part 34 determines whether dimming is possible when the headlamps (low) 21 are on. It is determined whether dimming is possible using the image data that are acquired by the camera 28. The dimming possibility determination part 34 determines whether dimming is possible by causing the dimming control part 35 to dim the headlamps (low) 21 by a prescribed amount and monitoring the brightness in the image data. For example, the dimming possibility determination part 34 determines that the surroundings are so light that dimming is possible if the rate of decrease in brightness in the image data is not greater than a prescribed value when the duty is decreased by several to a few dozens of percent. The determination method is described in connection with FIG. 5.

When it is determined that dimming is possible, the dimming possibility determination part 34 requests the dimming control part 35 to carry out dimming. Then, because the dimming control part 35 causes the light control part 11 to reduce the duty of the PWM signal to the lower limit duty or a value which is slightly greater than the lower limit duty, the luminance of the headlamps (low) 21 and the headlamps (high) 22 is reduced to reduce power consumption. Here, there are following modes in which the dimming control part 35 reduces the luminance of the headlamps (low) 21.

A. Aspect in which all of the LEDs 1 to 4 are driven at the same duty.

B. Aspect in which some of the LEDs 1 to 4 are turned off and some or all of the other LEDs 1 to 4 are driven at a lower duty if necessary.

The aspect A is more feasible because the LEDs 1 to 4 are arranged to form a desired light distribution pattern and the desired light distribution pattern may not be achieved when some of the LEDs are turned off as in the aspect B. It is, however, considered that the electric power necessary for the headlamps (low) 21 to provide a certain level of illuminance in the aspect B may be lower than that necessary to provide the same illuminance in the aspect A because the turned-off LEDs consume no electric power. In addition, because the dimming possibility determination part 34 carries out dimming after it is determined that the surroundings are light in the first embodiment, there may be a case where there is no need to strictly form the desired light distribution pattern. Therefore, the dimming control part 35 can perform dimming control in an aspect in which the power consumption is smaller of the two aspects A and B. When the aspect B is adopted, the vehicle manufacturer or headlamp manufacturer preliminarily measures the decrease in illuminance when the LEDs are turned off to determine the LEDs that can be turned off and their positions. While description about the headlamps (high) 22 is omitted, the same principle is applicable.

Figure 5:
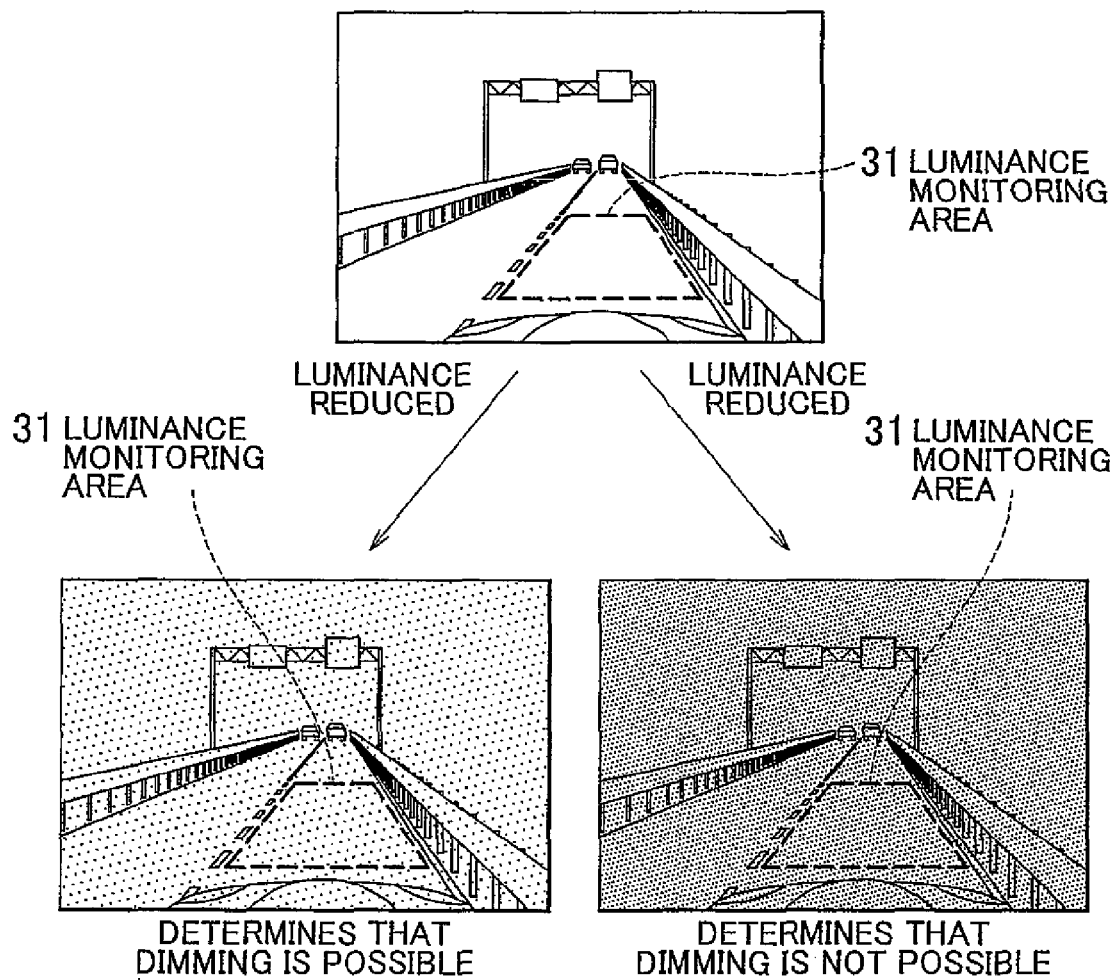
FIG. 5 shows an example of a diagram that illustrate the determination on whether or not dimming is possible in a first embodiment of the present invention.

FIG. 5 shows an example of a drawing that illustrates the determination on whether dimming is possible. The camera 28 controls set values so that the aperture and shutter speed (exposure time) can be automatically adjusted based on the ambient illuminance and appropriate image data can be obtained. Thus, image data with different brightness may be obtained depending on the set values even if the camera 28 takes images of exactly the same scenery. However, the set values of the camera 28 may be regarded as constant within a short period of time because the ambient brightness rarely changes quickly. When the ambient brightness changes quickly, the brightness sensor 14 may detect the change to delay the determination on whether dimming is possible by the dimming possibility determination part 34 for a prescribed period of time.

Although the effect of the set values of the camera 28 can be avoided in this way, the image data that are acquired by the camera 28 change continuously while the vehicle is moving. Thus, it may be impossible to determine whether the effect on the image data which is observed when the dimming control part 35 carries out the dimming is caused by the change in the luminance of the headlamps (low) 21 and the headlamps (high) 22 or the change of the photographed subject. Therefore, in the first embodiment, an area in the image data in which the photographed subject is less likely to change is used for the determination of a change in illuminance. FIG. 5 shows examples of image data that are acquired by the camera 28. In the image data, a part of the bonnet, lane markings, road surface, preceding vehicles, scenery and so on are included. Of these, the preceding vehicles and scenery change significantly and are therefore not suitable for use in monitoring the effect of a change in the luminance of the headlamps (low) 21 and the headlamps (high) 22. The bonnet does not change so significantly but is located in such a position where it is unlikely to be affected by a change in luminance of the headlamps (low) 21 and the headlamps (high) 22. Thus, the lane markings or road surface is suitable for the dimming possibility determination part 34 to monitor the effect of a change in the luminance of the headlamps (low) 21 and the headlamps (high) 22.

Because the road surface is usually photographed right in front of the vehicle even when the preceding vehicles are moving, an area of the road surface right in front of the vehicle to be photographed can be preliminary determined in the image data. In FIG. 5, the area is indicated by dotted lines. In FIG. 5, the area is indicated by dotted lines.

A method for detecting lane markings in image data is known. Specifically, the dimming possibility determination part 34 detects edges in the lateral direction in the image data and estimates white lines from straight lines that are obtained by connecting the edges in the vertical direction of the image data. For example, an area between two straight lines in the left half of the image data and an area between two straight lines in the right half of the image data are the areas in which a lane marking is photographed. The area in which the dimming possibility determination part 34 monitors the effect of a decrease in luminance is hereinafter referred to as "luminance monitoring area 31."

When the image data consist of black-and-white images, the pixel values (density) in the luminance monitoring area 31 are between 0 (black) and 255 (white). In the case of RGB color images, the pixel values may be converted into luminance values. The dimming possibility determination part 34 calculates the average, for example, of the pixel values in the luminance monitoring area 31 for each frame, and determines whether the decrease in the luminance of the headlamps (low) 21 and the headlamps (high) 22 has any effect. It is expected that the average of the pixel values decreases gradually when the surroundings are dark and the average of the pixel values does not change significantly when the surroundings are light.

The dimming possibility determination part 34 determines whether dimming is possible by comparing the rate of change in the average of the pixel values in the luminance monitoring area 31 to a threshold value when the luminance of the headlamps (low) 21 and or the headlamps (high) 22 is reduced by a predetermined amount. The threshold value can be determined as a rate of change in the average of the pixel values at which the driver feels dark when the luminance of the headlamps (low) 21 and the headlamps (high) 22 is reduced in an environment with a brightness of ordinary tunnels.

Rate of change=(Original average value−Average value after change)/Original average value If the rate of change is smaller than the threshold value, it is determined that dimming is possible.

It should be noted that while the luminance of both the headlamps (low) 21 and the headlamps (high) 22 is supposed to be reduced with no distinction, the headlamps (high) 22 may be exempt from being dimmed. This is because there is a case where dimming the headlamps (low) 21 and the headlamps (high) 22 equally is not preferable since dimming the headlamps (high) 22 reduces the illuminance at a long distance even if the change in illuminance is small in the luminance monitoring area 31.

Figure 6:
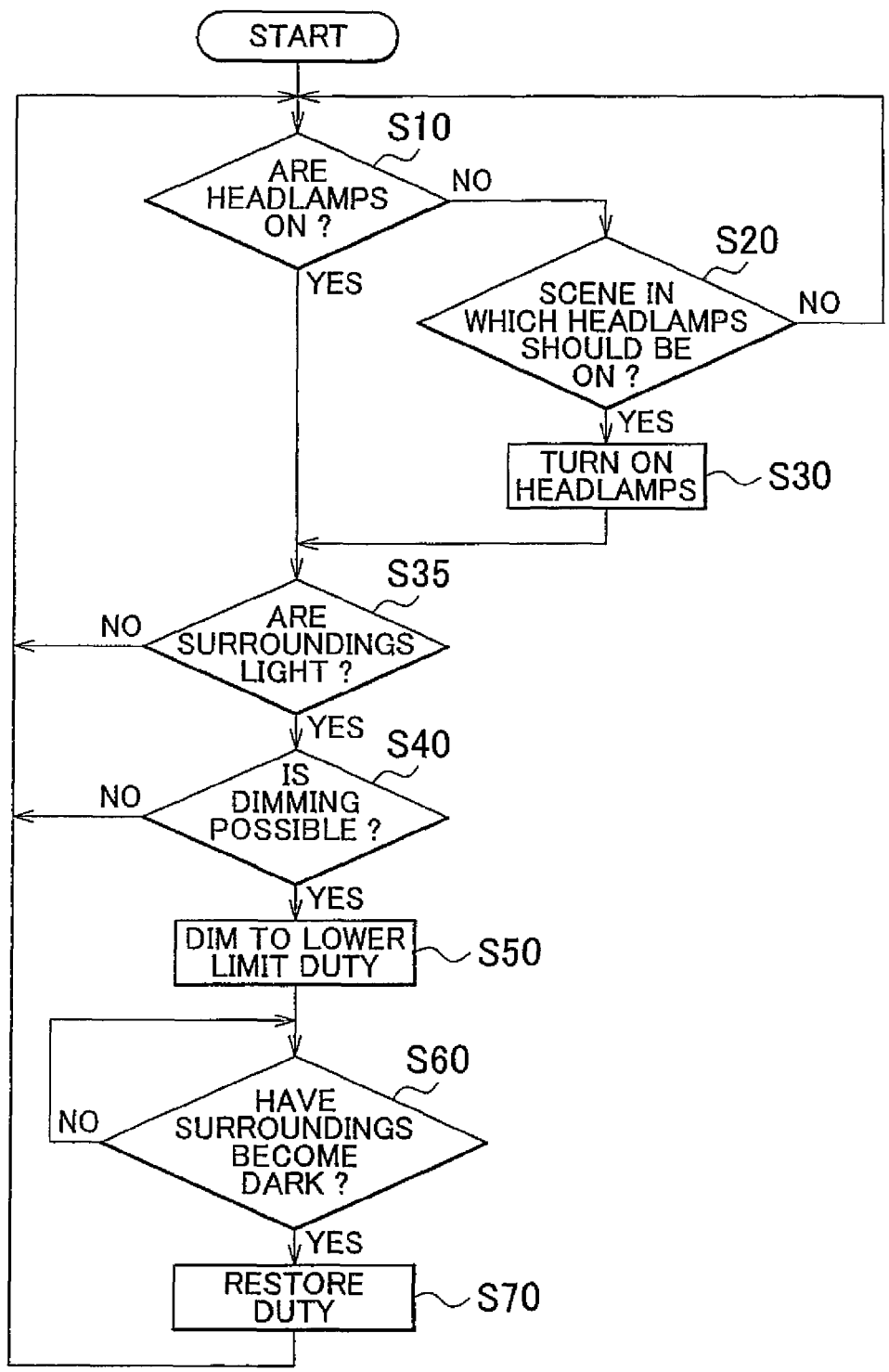
FIG. 6 shows an example of a flowchart that shows a procedure by which the headlamp device of the first embodiment of the present invention dims the headlamps.

FIG. 6 shows an example of a flowchart that shows a procedure by which the headlamp device 100 dims the headlamps (low) 21. The procedure in FIG. 6 is started when the ignition is turned on or when the main system (in the case of a hybrid vehicle or electrical vehicle) is turned on.

First, the lighting scene determination part 33 determines whether the headlamps (low) 21 are on (S10). If the headlamps (low) 21 are not on (No in S10), it is determined whether the vehicle is in a scene in which the headlamps (low) 21 should be on as in a conlight (S20). In the first embodiment, it is determined that the headlamps (low) 21 should be on when the ambient illuminance that is detected by the brightness sensor 14 is simply lower than a prescribed value. It may also be determined whether the vehicle is in a tunnel using positional information and map data.

In a scene in which the headlamps (low) 21 should be on (Yes in S20), the control ECU 12 requests the light control part 11 to turn on the headlamps (low) 21 (S30). In other words, low beams are formed. In a scene in which the headlamps (low) 21 should not be on (No in S20), the routine in FIG. 6 is terminated because there is no need to reduce the luminance of the headlamps (low) 21.

If the headlamps (low) 21 are on (Yes in S10), the dimming possibility determination part 34 determines whether the surroundings are light (S35). This determination is made to determine whether to start the determination on whether or not dimming is possible by changing the luminance. This determination is made using the value of illuminance that is detected by the brightness sensor 14.

If the surroundings are light (Yes in S35), the dimming possibility determination part 34 determines whether dimming is possible (S40). As described above, the dimming possibility determination part 34 requests the dimming control part 35 to reduce the duty by a predetermined amount. Then, because the luminance of the headlamps (low) 21 is reduced by a certain amount, the dimming possibility determination part 34 determines whether dimming is possible by monitoring the pixel values in the luminance monitoring area 31 in image data.

If dimming is possible (Yes in S40), the dimming possibility determination part 34 causes the dimming control part 35 to dim the headlamps (low) 21 (S50) because it is estimated that the surroundings are light. If the headlamps (high) 22 are on, the headlamps (high) 22 are also dimmed.

As a result, power consumption can be reduced because the headlamps (low) 21 are lighted at the lower limit duty. Even if the headlamps (low) 21 are dimmed, the driver and the drivers of other vehicles do not feel uncomfortable because the surroundings are light.

If dimming is not possible (No in S40), the dimming possibility determination part 34 does not cause the dimming control part 35 to dim the headlamps (low) 21 because it is estimated that the surroundings are dark.

It should be noted that the dimming possibility determination part 34 determines whether the surroundings have become dark (S60) after the headlamps (low) 21 have been dimmed, and restores the duty if the surroundings have become dark (S70). Therefore, the luminance of the headlamps (low) 21 can be automatically restored after the vehicle has passed through a tunnel at night, for example.

As described above, the headlamp device 100 of the first embodiment can reduce power consumption by reducing the luminance of the headlamps (low) 21 when it is determined that the vehicle is in a dimmable scene.

A second embodiment is next described. The headlamp device 100, which dims the headlamps (low) 21 in a simple lighting scene, is described in the first embodiment, whereas a headlamp device 100 which carries out dimming in specific lighting scenes in aspects suitable for the lighting scenes is described in the second embodiment.

Specific examples include the following lighting scenes.
(1) When the Vehicle Turns Left
When the vehicle turns left at an intersection or the like with the right and left headlamps (low) 21 on, reduction in luminance of the right headlamp (low) 16 has no significant effect because the right headlamp (low) 16 is out of the driver's sight. Thus, the headlamp device 100 can dim the right headlamp (low) 16 to a luminance corresponding to the lower limit duty.
(2) When the Vehicle is being Driven on a Highway with High Beams
In ordinary vehicles, when the headlamps (high) 22 for high beams are turned on, the headlamps (low) 21 for low beams are also lighted. It is effective to keep the low beams on to respond to a sudden change of situation on ordinary roads, but high beams suffices on a highway. Thus, the headlamp device 100 can dim the headlamps (low) 21 to a luminance corresponding to the lower limit duty when the vehicle is being driven on a highway with high beams.
(3) When the User is Using Fog Lamps in a Fog During the Day
Some drivers keep the headlamps (low) 21 on with fog lamps on even during the day, but the headlamps (low) 21 may not have to be kept on during the day if fog lamps are on. Thus, the headlamp device 100 can dim the headlamps (low) 21 to a luminance corresponding to the lower limit duty when the user is using fog lamps in a fog during the day.

While the functional block diagram of the second embodiment is the same as that in FIG. 4, the lighting scene determination part 33 determines whether the vehicle is in a lighting scene such as (1) to (3) above. To determine the lighting scene (1), it is necessary to detect that the lights are on, that the vehicle is at an intersection, and that the vehicle is turning left, for example. The fact that the vehicle is at an intersection is determined by the fact that there is no lane marking in the image data that are acquired by the camera 28 with a traffic signal being detected, the fact that the roads cross, and so on. Detection of the fact that the vehicle is approaching an intersection through road-to-vehicle communication and the detection of the fact that the vehicle is in the left-turn lane of an intersection from positional information can be used complementarily. The fact that the vehicle is turning left is determined based on the state of the winker switch, the steering angle and so on.

Some vehicles are provided with a function of additionally lighting a left cornering lamp when turning left. A scene in which the vehicle is turning left can be determined more precisely when the scene (1) is determined based on the fact that the cornering lamp is on.

The lighting scene determination part 33 preliminarily makes a list of conditions for detection of the fact that the vehicle turns left at an intersection and may determine that the vehicle is in the lighting scene (1) when 80 percent, for example, of the conditions are met. To determine the lighting scene (2), it is necessary to detect that the right and left headlamps (high) 22 are on, and that vehicle speed information that is detected by a vehicle speed sensor has been higher than a prescribed value for a prescribed period of time or longer, for example. To determine the lighting scene (3), it is necessary to detect that the headlamps (low) 21 are on, that the fog lamps are on, and that it is foggy, for example. Whether or not the fog lamps are on is detected from the fog lamp switch. The fact that it is foggy is detected by performing a filtering process which produces a larger (or smaller) calculation value when images of foggy scenes are included in the image data that are acquired by the camera 28 and comparing the calculation value to a threshold value. Alternatively, it is detected based on the fact that the degree of coincidence as compared to image data of a foggy scene that are preliminarily provided is equal to or greater than a threshold value. Alternatively, it is detected based on the fact that the weather information that is acquired from outside through a cellular phone network or through road-to-vehicle or vehicle-to-vehicle communication informs that it is foggy in the area where the vehicle is being driven. The lighting scene determination part 33 can use at least two of the determination methods in combination to determine that it is foggy.

Figure 7:
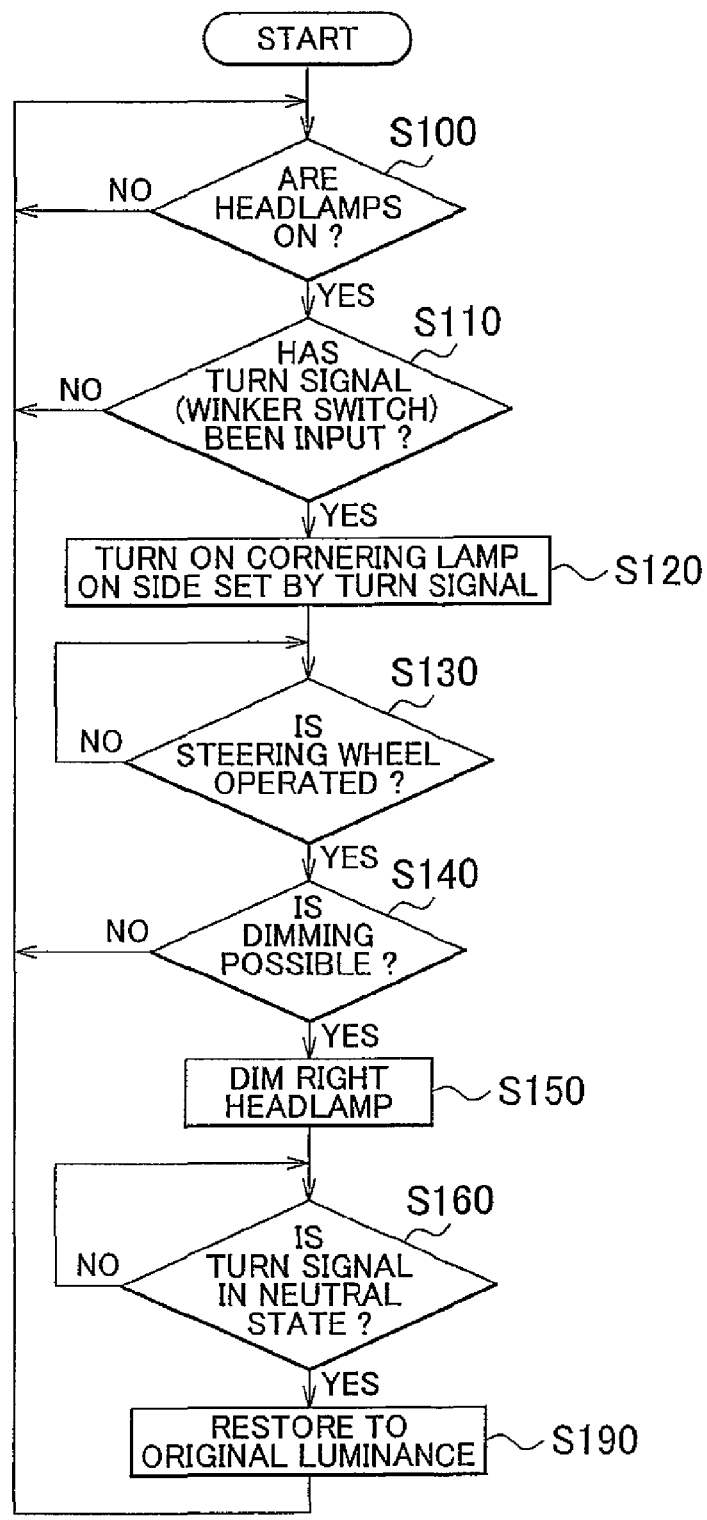
FIG. 7 shows an example of a flowchart corresponding to a lighting scene in which the vehicle turns left at an intersection in a headlamp device of a second embodiment of the present invention.
Figure 8:
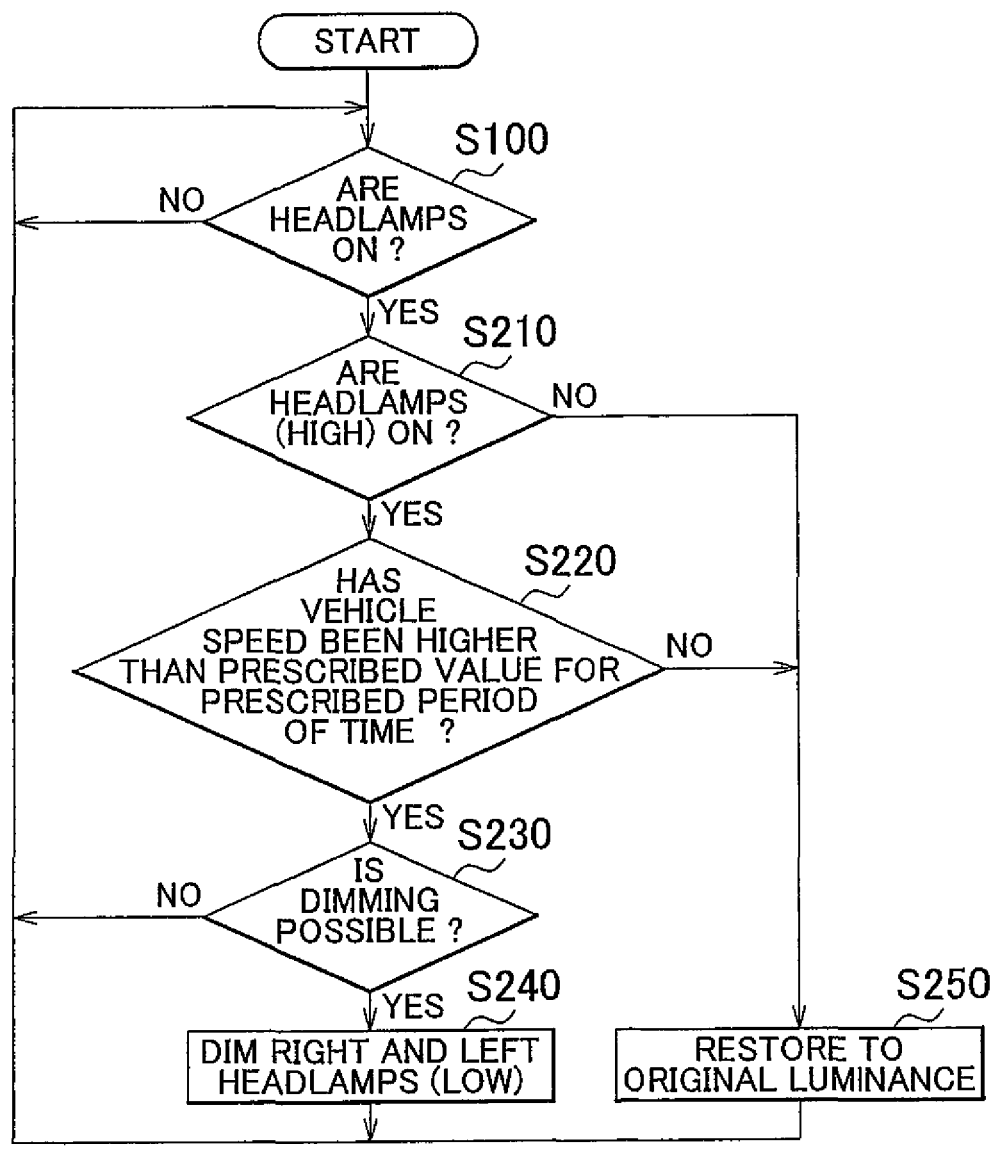
FIG. 8 shows an example of a flowchart corresponding to a lighting scene in which the vehicle is being driven on a highway with high beams in a headlamp device of a second embodiment of the present invention.
Figure 9:
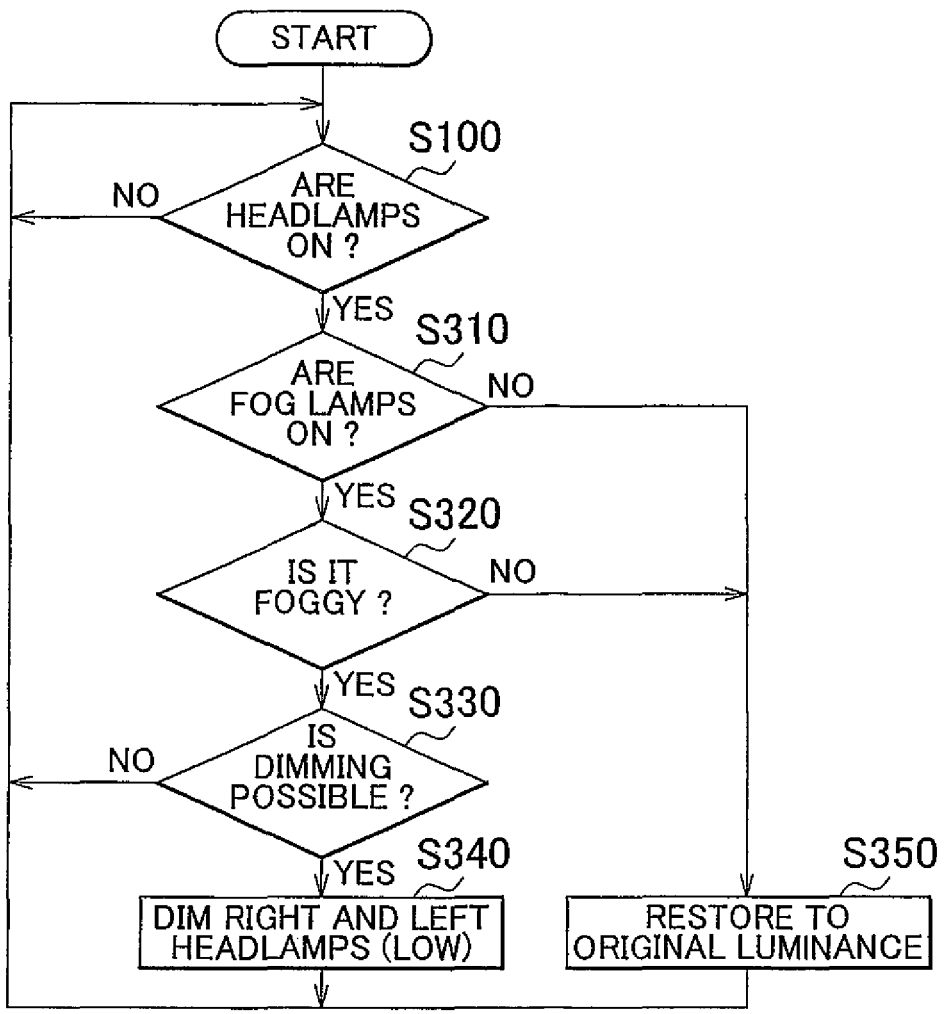
FIG. 9 shows an example of a flowchart corresponding to a lighting scene in which fog lamps are on in the headlamp device of the second embodiment of the present invention.

Each of FIGS. 7 to 9 shows an example of a flowchart that shows a procedure by which the headlamp device 100 dims the headlamps (low) 21. The procedures in FIGS. 7 to 9 are started when the ignition is turned on or when the main system (in the case of a hybrid vehicle or electrical vehicle) is turned on.

FIG. 7 shows a flowchart corresponding to the lighting scene (1), in which the vehicle turns left. First, the lighting scene determination part 33 detects that the headlamps (low) 21 are on (100). This step is common to all the lighting scenes.

Next, the lighting scene determination part 33 determines whether a turn signal (winker switch) has been input (S110).

If a turn signal has been input (Yes in S110), the control ECU 12 turns on the cornering lamp on the side that is set by the turn signal (S120).

After that, the lighting scene determination part 33 waits until the driver operates the steering wheel (No in S130), and determines that the vehicle is in the lighting scene (1) when the driver operates the steering wheel (Yes in S130). As a result, the dimming possibility determination part 34 can determine whether dimming is possible to start dimming as in the first embodiment.

Specifically, the dimming possibility, determination part 34 requests the dimming control part 35 to reduce the duty by a predetermined amount. Then, because the luminance of the headlamps (low) 21 and the headlamps (high) 22 is reduced by a certain amount, the dimming possibility determination part 34 determines whether dimming is possible by monitoring the pixel values in the luminance monitoring area 31 in image data.

If dimming is possible (Yes in S140), the dimming possibility determination part 34 causes the dimming control part 35 to dim the right headlamp (low) 16 (S150) because it is estimated that the surroundings are light. When the headlamps (high) 22 are on, the dimming control part 35 dims both the right headlamps (low) 16 and the right headlamps (high) 15.

The dimming control part 35 continues the dimming until the turn signal returns to a neutral state (No in S160), and finishes the dimming and restore the luminance (S190) when the turn signal returns to a neutral state. The determination in step S160 is made to determine that the lighting scene (1) has ended.

As described above, when a lighting scene in which the vehicle turns left is detected, power consumption can be reduced because the headlamp device 100 carry out the dimming after making sure that the driver and the drivers of other vehicle will not have an uncomfortable feeling.

FIG. 8 shows a flowchart corresponding to the lighting scene (2), in which the vehicle is being driven on a highway with high beams. First, the lighting scene determination part 33 detects that the headlamps (low) 21 are on (100). This step is common to all the lighting scenes.

Next, the lighting scene determination part 33 determines whether the headlamps (high) 22 are on (S210). If the headlamps (high) 22 are off (No in S210), the headlamp device 100 maintains the luminance of the headlamps (low) 21 because the headlamps (low) 21 should not be dimmed (S250).

If the headlamps (high) 22 are on (Yes in S210), the lighting scene determination part 33 determines whether the vehicle speed has been higher than a prescribed value (50 to 100 km/h, for example) for a prescribed period of time (S220) to determine whether the vehicle is being driven on a highway. The prescribed period of time is approximately one minute to several minutes, for example, because it cannot be distinguished from the time between traffic signals on an ordinary road if it is too short.

When the vehicle speed has been higher than a prescribed value for a prescribed period of time (Yes in S220), the dimming possibility determination part 34 determines that the vehicle is in the lighting scene (2) because it is highly possible that the vehicle is being driven on a highway. As a result, the dimming possibility determination part 34 can determine whether dimming is possible to start dimming.

While the determination procedure is the same as shown in FIG. 7, the dimming possibility determination part 34 only determines whether the headlamps (low) 21 can be dimmed (S230) because the headlamps (low) 21 are dimmed in the procedure in FIG. 8. If dimming is not possible (No in S230), the headlamps (low) 21 are not dimmed.

If dimming is possible (Yes in S230), the dimming possibility determination part 34 causes the dimming control part 35 to dim only the right and left headlamps (low) 21 (S240) because the headlamps (high) 22 are providing sufficient illuminance.

If the dimming possibility determination part 34 determines that the vehicle is not in the lighting scene (2), the dimming possibility determination part 34 restores the headlamps (low) 21 to the original luminance (S250). In other words, if it is determined in step S210 that the headlamps (high) 22 are off, or if it is determined in step S220 that the vehicle speed has not been higher than a prescribed value for a prescribed period of time, the dimming possibility determination part 34 causes the dimming control part 35 to finish the dimming and restore the headlamps (low) 21 to the original luminance (S250). Therefore, when the driver turns off the headlamps (high) 22 or decelerate to get off the highway or go into a parking area, sufficient illuminance can be obtained from the headlamps (low) 21.

As described above, when the headlamp device 100 detects a lighting scene in which the vehicle is being driven on a highway with high beams, the power consumption can be reduced because the headlamp device 100 carries out the dimming after making sure that sufficient illuminance is obtained from the headlamps (high) 22.

FIG. 9 shows a flowchart corresponding to the lighting scene (3), in which fog lamps are on. First, the lighting scene determination part 33 detects that the headlamps (low) 21 are on (100). This step is common to all the lighting scenes.

Next, the lighting scene determination part 33 determines whether the fog lamps are on (S310). If the fog lamps are off (No in S310), the headlamp device 100 maintains the headlamps (low) 21 at the current luminance (S350) because the headlamps (low) 21 should not be dimmed.

If the fog lamps are on (Yes in S310), it is determined whether it is foggy (S320) to determine whether the fog lamps are lighted because it is foggy.

If it is foggy (Yes in S320), the dimming possibility determination part 34 determines that the vehicle is in the lighting scene (3). As a result, the dimming possibility determination part 34 can determine whether dimming is possible to start dimming. The determination procedure is the same as that in FIG. 7 (S330).

If dimming is possible (Yes in S330), the dimming possibility determination part 34 causes the dimming control part 35 to dim the right and left headlamps (low) 21 (S340) because the fog lamps is providing sufficient illuminance. If the headlamps (high) 22 are on, the headlamps (high) 22 are also dimmed to reduce power consumption.

If the dimming possibility determination part 34 determines that the vehicle is not in the lighting scene (3), the dimming possibility determination part 34 restores the headlamps (low) 21 to the original luminance (S350). In other words, if it is determined in step S310 that the fog lamps are off, or if it is determined in step S320 that the fog has cleared, the dimming possibility determination part 34 causes the dimming control part 35 to end the dimming to restore the headlamps (low) 2 to the original luminance. Therefore, when the fog has cleared or when the fog lamps are turned off, the driver can obtain sufficient illuminance from the headlamps (low) 21.

According to second embodiment, power consumption can be reduced in a more effective manner because dimming is achieved in specific lighting scenes in modes suitable for the lighting scenes.

A third embodiment is next described. In the first and second embodiments, the luminance of the headlamps (low) 21 are reduced to a value corresponding to the lower limit duty. The lower limit duty guarantees a luminance that is required by low, but the driver may feel dark when the luminance is reduced to a value corresponding to the lower limit duty in view of the fact that humans eyes are sensitive not only to the absolute value of brightness but also to a change in brightness. Thus, in the third embodiment, a headlamp device 100, which can vary the duty in reducing the luminance of the headlamps (low) 21 depending on the effect of a change in luminance on the ambient illuminance, is described.

Figure 10:
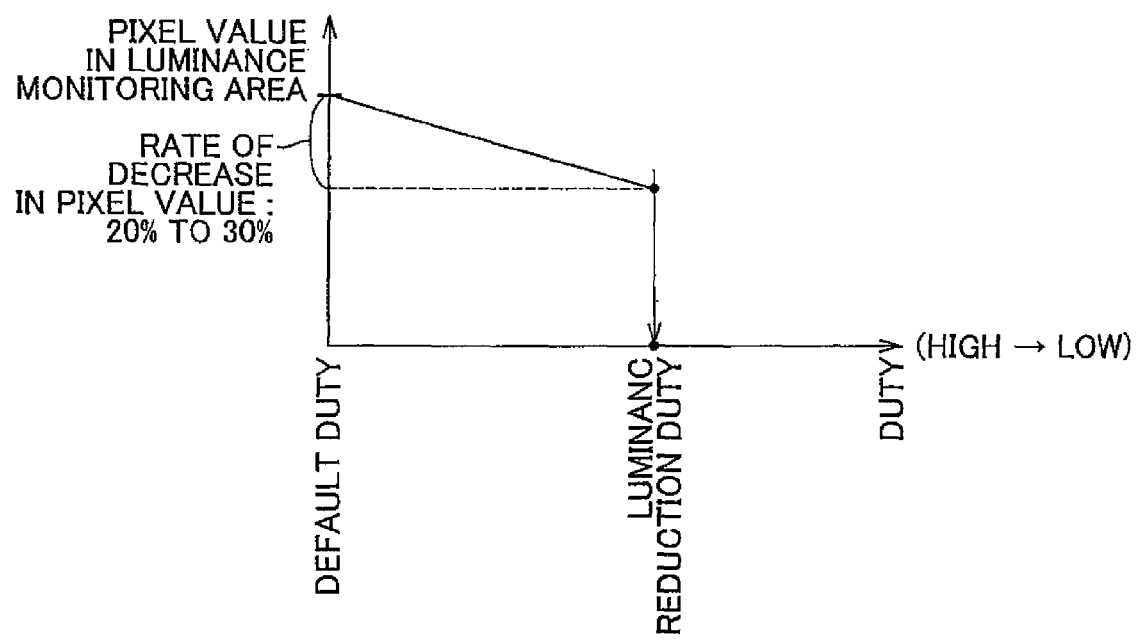
FIG. 10 is a view that shows an example of the relationship between the duty and the pixel values in a luminance monitoring area in a headlamp device of a third embodiment of the present invention.

FIG. 10 shows an example of the relationship between the duty and the pixel values in the luminance monitoring area 31. While a brightness that is required by law or higher can be obtained at the default duty, the pixel values in the luminance monitoring area 31 are affected by the ambient illuminance.

As described above, if the surroundings are light, the pixel values in the luminance monitoring area 31 are higher even if the default duty is constant.

Also, when the duty is decreased, the pixel values in the luminance monitoring area 31 decrease but the degree of decrease depends on the ambient illuminance. In other words, the lighter the surroundings are, the smaller the change in ambient illuminance will be, even if the duty is reduced significantly. Therefore, it is ensured that the change in brightness that the driver feels can be small when the rate of decrease in the pixel values in the luminance monitoring area 31 from those which are obtained at the default duty is limited to a prescribed value or smaller (20% to 30%, for example). The headlamp device 100 gradually reduces the luminance of the headlamps (low) 21 and determines the duty at which the rate of decrease in the pixel values reaches a prescribed value as a control value (duty) for the headlamps (low) 21. The duty that is determined in this way is hereinafter referred to as "luminance reduction duty." The luminance reduction duty is always equal to or greater than the lower limit duty. Lower limit duty≤Luminance reduction duty<Default duty FIG. 11 shows an example of a flowchart that shows a procedure by which the headlamp device 100 dims the headlamps (low) 21. The process up to step S40 in FIG. 11 is the same as that in FIG. 6, and therefore its description is omitted. If dimming is possible in step S40 (Yes in S40), the dimming possibility determination part 34 starts to decrease the duty gradually to determine a luminance reduction duty (S42). The dimming possibility determination part 34 records the pixel values in the luminance monitoring area 31 at the default duty.

The dimming possibility determination part 34 decreases the duty by, for example, 1% at a time and monitors the pixel values in the luminance monitoring area 31 in the image data that are acquired by the camera 28. Then, the dimming possibility determination part 34 determines whether "the rate of decrease in the pixel values in the luminance monitoring area has reached a prescribed value" or "the duty has reached the lower limit duty" (S44).

The dimming possibility determination part 34 decreases the duty continuously until the determination in step S44 is positive (S42).

When the determination in step S44 is positive (Yes in S44), the dimming possibility determination part 34 determines the duty at this time as a luminance reduction duty (S46).

The dimming possibility determination part 34 requests the dimming control part 35 to light the headlamps (low) 21 at the luminance reduction duty (S48). If the headlamps (high) 22 are on, the headlamps (high) 22 are also dimmed. As a result, because the luminance can be reduced based on the ambient illuminance, power consumption can be reduced without making the driver feel dark. The subsequent process is the same as that in FIG. 6.

While the third embodiment has been described based on the first embodiment, the above principle is applicable in dimming the headlamps (low) 21 and the headlamps (high) 22 in the lighting scenes (1) to (3) in the second embodiment. In addition, the luminance reduction duty may be varied for each of the lighting scenes (1) to (3).

As described above, the headlamp device 100 of this embodiment can dynamically determine an optimum value of the luminance of the headlamps (low) 21 from the viewpoints of both visibility and power consumption.

The invention claimed is:

1. A headlamp device for a vehicle that has LEDs as light sources, comprising:

a situation detection portion detecting that a situation is a headlamp lighting situation in which headlamps should be on;

a headlamps control portion turning on the headlamps when the situation detection means detects that the situation is the headlamp lighting situation;

a luminance reduction portion reducing luminance of the headlamps by a prescribed amount;

an image acquiring portion that acquires image data on an area illuminated by the headlamps; and a dimming control portion that observes a rate of decrease in brightness of the image data on the area illuminated by the headlamps when the luminance of the headlamps is reduced by the prescribed amount by the luminance reduction portion, compares the rate of decrease in brightness with a threshold value, reduces the luminance of the headlamps to a prescribed value that is greater than zero based on a determination that the rate of decrease in brightness is smaller than the threshold value, and maintains the luminance of the headlamps based on a determination that the rate of decrease in brightness is equal to or larger than the threshold value.

2. The headlamp device according to claim 1, further comprising:

a camera as the image acquiring portion, the camera having an optical axis, the optical axis being ahead of the vehicle, the dimming control determining whether a rate of decrease in illuminance of the area illuminated by the headlamps is smaller than a threshold value by comparing pixel value information in image data acquired by the camera before the luminance of the headlamps is reduced by the prescribed amount by the luminance reduction portion and pixel value information in image data acquired by the camera after the luminance of the headlamps is reduced by the prescribed amount.

3. The headlamp device according to claim 2, wherein the dimming control portion monitors the pixel value information acquired when the luminance of the headlamps is gradually reduced by the luminance reduction portion, and the dimming control portion determines the luminance at a time when the pixel value information is changed by a prescribed percentage from the pixel value information before the luminance is reduced as the luminance of the headlamps.

4. The headlamp device according to claim 2, wherein the dimming control portion determines whether the rate of decrease in the illuminance of the area illuminated by the headlamps is smaller than the threshold value based on the pixel value information in a predetermined area in the image data, the predetermined area being more likely to be affected by the illuminance of the area illuminated by the headlamps than by a change of the surrounding scenery.

5. The headlamp device according to claim 1, wherein the dimming control portion reduces the luminance of the headlamps by reducing the duty of a PWM signal, the PWM signal driving a plurality of LEDs.

6. The headlamp device according to claim 1, wherein the dimming control portion reduces the luminance of the headlamps by turning off some of the plurality of LEDs.

7. The headlamp device according to claim 1, further comprising a situation detection portion, wherein the situation detection portion detects a situation in which the vehicle turns left, as the headlamp lighting situation and the dimming control portion turns off only the headlamp on a right side.

8. The headlamp device according to claim 1, further comprising a situation detection portion, wherein
the situation detection portion detects a situation in which the vehicle is being driven on a highway with the headlamps forming a driving beam distribution, as the headlamp lighting situation, and the dimming control portion reduces the luminance of the headlamps forming a dipped beam distribution.

9. The headlamp device according to claim 1, further comprising a situation detection portion, wherein
the situation detection portion detects a situation in which the vehicle is being driven in a fog with fog lamps on, as the headlamp lighting situation, and the dimming control portion reduces the luminance of the headlamps.

10. The headlamp device according to claim 9, further comprising a situation detection portion, wherein
the situation detection portion detects that the vehicle is being driven in a fog from the fact that a calculation value obtained by performing a filtering process on image data on the outside of the vehicle is equal to or greater than a threshold value, the image data being acquired by the camera, the fact that a degree of coincidence as compared to image data of a foggy scene is equal to or greater than a threshold value, the image data being preliminarily provided, or the fact that weather information acquired from outside indicates that it is foggy in the area where the vehicle is being driven.

11. A luminance control method for a headlamp device for a vehicle having LEDs as light sources, comprising:
detecting that a situation is a headlamp lighting situation in which the headlamps should be on by a situation detection portion;
turning on the headlamps when the headlamp lighting situation has been detected by a headlamp control portion;
reducing the luminance of the headlamps to a prescribed amount by a luminance reduction portion,
acquiring image data on an area illuminated by the headlamps by an image acquiring portion,
observing a rate of decrease in brightness of the image data on the area illuminated by the headlamps when the luminance of the headlamps is reduced by the prescribed amount by the luminance reduction portion,
comparing the rate of decrease in brightness with a threshold value,
reducing the luminance of the headlamps to a prescribed value that is greater than zero based on a determination that the rate of decrease in brightness is smaller than the threshold value, and
maintaining the luminance of the headlamps based on a determination that the rate of decrease in brightness is equal to or larger than the threshold value.

* * * * *